(No Model.)
H. H. CUMMINGS.
MANUFACTURE OF LACING HOOKS FOR SHOES.
No. 414,684. Patented Nov. 12, 1889.
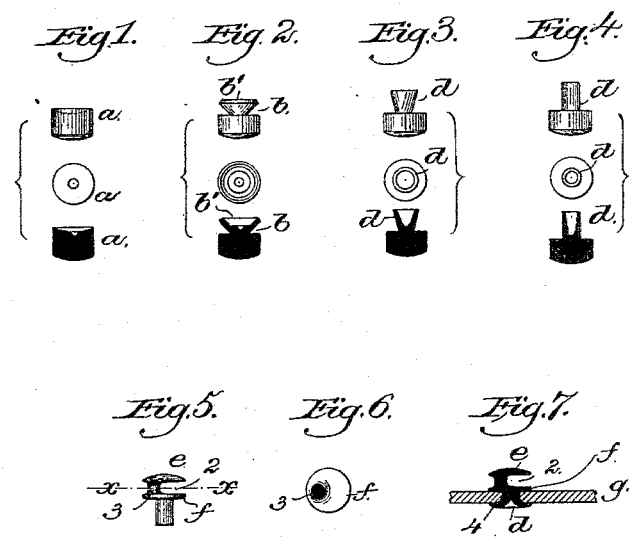
Witnesses.
John F. C. Prentkerk
Frederick L. Emery
Inventor:
Henry H. Cummings,
by Crosby & Gregory
Attys.

UNITED STATES PATENT OFFICE.

HENRY H. CUMMINGS, OF MALDEN, MASSACHUSETTS.

MANUFACTURE OF LACING-HOOKS FOR SHOES.

SPECIFICATION forming part of Letters Patent No. 414,684, dated November 12, 1889.

Application filed August 7, 1889. Serial No. 320,053. (No model.)

*To all whom it may concern:*

Be it known that I, HENRY H. CUMMINGS, of Malden, county of Middlesex, State of Massachusetts, have invented an Improvement in Manufacture of Lacing-Hooks for Boots, Shoes, Gloves, &c., of which the following description, in connection with the accompanying drawings, is a specification, like letters on the drawings representing like parts.

This invention has for its object to improve the method of manufacturing lacing-hooks having hollow shanks or points, whereby they may be upset or clinched in the material.

My invention in the manufacture of lacing-hooks consists in forming the hollow shank or point of the hook by cutting partially into the periphery of a metal blank to leave or not disturb the head portion and overturning another portion of the said blank to leave a shank with a hollow point.

Figure 1 shows in side elevation, plan, and section a metal blank suitable for the manufacture of a lacing-hook in accordance with my method; Figs. 2, 3, and 4, like views of the blank in different stages of operation. Fig. 5 shows in elevation a lacing-hook made from the blank Fig. 4; Fig. 6, a section in the line $x$, Fig. 5; and Fig. 7, a vertical section taken through the lacing-hook set into the material.

The metal blank $a$ used in the production of the lacing-hook is in the form of a disk or a part of a cylinder, as in Fig. 1. Preferably this blank will be punched from a rolled-metal plate. The blank is then acted upon at its periphery by dies or other suitable tool to cut into the periphery of the blank, as at $b$, Fig. 2, the cut $b$ being sufficiently distant from one end of the blank so as not to interfere with that part of the blank which is to furnish the hook-forming part. The part $b'$, turned over outwardly from the blank, as in Fig. 2, is then further acted upon or subjected to what is known as a "spinning operation," and is brought into the position substantially as in Fig. 3, or still further reduced into substantially tubular form, as in Fig. 4, leaving a hollow-pointed shank $d$.

The hook part $e$ of the lacing-hook shown in Fig. 5 may be formed in usual manner by mounting the blank in the stages represented in Figs. 3 or 4, or even in the condition shown in Fig. 1, if desired, eccentrically on a chuck of a lathe and rotating the said blank, the latter during its rotation being acted upon by a milling-tool or metal saw to cut into the periphery of the blank and remove a portion of the stock, leaving an annular groove, as $e$, but preferably of unequal depth, so as to leave a part 3 located out of the line of the center of the shank $d$, the said part connecting the shoulder or seat $f$ with the hook part $e$. The shape of the head or hook part $e$ may be variously modified without departing from my invention, as the gist of this invention rests chiefly in the method employed of making the hollow point, and so it is immaterial whether the blank be milled or cut as described to form the hook part $e$ after or before forming the hollow point; but I prefer for cheapness to perform the operations in the order illustrated.

In another application, Serial No. 280,565, filed July 13, 1888, I have shown, described, and claimed a method of manufacturing hollow-pointed headed rivets.

The hollow point of the lacing-hook herein described may be formed by subjecting the blank to the action of dies as provided for in my application, Serial No. 313,536, filed June 8, 1889, or may be made by any usual tool which will gradually act to turn over a part of the blank as represented.

Heretofore the hollow shank of this class of hooks, if seamless, has been formed by boring into the blank.

The shank, more or less conical or substantially cylindrical in cross-section, when inserted in the leather or other material $g$, will be upset by any usual punch, as shown in Fig. 7.

I claim—

The method of forming a hollow-pointed shank of a lacing-hook, consisting in cutting partially into the periphery of a metal blank and overturning a portion thereof, shaping the same to constitute the hollow point, and grooving the portion not overturned, to thereby form of it a hook, substantially as described.

In testimony whereof I have signed my name to this specification in the presence of two subscribing witnesses.

HENRY H. CUMMINGS.

Witnesses:
GEO. W. GREGORY,
EMMA J. BENNETT.